(12) United States Patent
Ikeda et al.

(10) Patent No.: US 8,017,677 B2
(45) Date of Patent: Sep. 13, 2011

(54) PLASTICIZER FOR RESIN AND RESIN COMPOSITION CONTAINING THE SAME

(75) Inventors: Yoshio Ikeda, Ichihara (JP); Takashi Kashiwamura, Ichihara (JP); Kunio Takeuchi, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/520,991

(22) PCT Filed: Mar. 28, 2007

(86) PCT No.: PCT/JP2007/056619
§ 371 (c)(1),
(2), (4) Date: Jun. 24, 2009

(87) PCT Pub. No.: WO2008/078417
PCT Pub. Date: Jul. 3, 2008

(65) Prior Publication Data
US 2010/0022692 A1    Jan. 28, 2010

(30) Foreign Application Priority Data
Dec. 26, 2006   (JP) .................... 2006-350044

(51) Int. Cl.
*C08K 5/1515* (2006.01)
*C08K 5/01* (2006.01)

(52) U.S. Cl. ......... 524/114; 524/474; 524/476; 524/481

(58) Field of Classification Search ................ 524/114, 524/474, 476, 481
See application file for complete search history.

(56) References Cited

U.S. PATENT DOCUMENTS

| 6,300,404 | B2 | 10/2001 | Nishimura et al. |
| 6,664,323 | B2 * | 12/2003 | Lucas ............ 524/474 |
| 2001/0003763 | A1 | 6/2001 | Nishimura et al. |
| 2002/0002263 | A1 | 1/2002 | Yako |
| 2007/0265380 | A1 * | 11/2007 | Fukunaga ........ 524/426 |
| 2007/0270537 | A1 * | 11/2007 | Suzuki et al. ........ 524/481 |

FOREIGN PATENT DOCUMENTS

| EP | 0 980 903 A2 | 2/2000 |
| EP | 0 980 903 A3 | 2/2000 |
| EP | 1 702 958 A1 | 9/2006 |
| JP | 55 36241 | 3/1980 |
| JP | 01 149851 | 6/1989 |
| JP | 5 65400 | 3/1993 |
| JP | 9 53010 | 2/1997 |
| JP | 11 50045 | 2/1999 |
| JP | 11 255986 | 9/1999 |
| JP | 2000 160133 | 6/2000 |
| JP | 2001 115129 | 4/2001 |
| JP | 2001 329126 | 11/2001 |
| JP | 2004 182997 | 7/2004 |
| WO | 01 42365 | 6/2001 |
| WO | WO 2005049730 A1 * | 6/2005 |
| WO | 2005 080504 | 9/2005 |

* cited by examiner

Primary Examiner — Kriellion A Sanders
(74) Attorney, Agent, or Firm — Oblon, Spivak, McClelland, Maier & Neustadt, L.L.P.

(57) ABSTRACT

A compound having a particular structural formula containing plural alkyl groups connected to each other, such as 9-methylenenonadecane, 2-decyl-2-octyloxirane and the like, is mixed in a resin composition for sealing. Accordingly, a resin composition without surface stickiness is obtained that has low viscosity and excellent thixotropic property before curing, and has excellent adhesion property and low tackiness residual property after curing, which can be favorably used as a resin composition for sealing for construction and automobile.

16 Claims, No Drawings

PLASTICIZER FOR RESIN AND RESIN COMPOSITION CONTAINING THE SAME

TECHNICAL FIELD

The present invention relates to a plasticizer for resin, and a resin composition containing the same, and more specifically, relates to a plasticizer for resin that has a low viscosity and is capable of providing a resin composition excellent in thixotropic property, adhesion property and low tackiness residual property, and a resin composition containing the same, particularly a resin composition for sealing.

BACKGROUND ART

A resin composition for sealing (which may be referred to as a sealant) generally contains a major component containing a polymer compound, such as organopolysiloxane, polyisobutylene with silyl end groups, a modified silicone polymer, a polysulfide polymer and the like, with a plasticizer, such as a phthalate ester, a process oil, polypropylene glycol and the like, a filler such as calcium carbonate and the like, and an additive, such as an antioxidant, a dripping preventing agent, a curing catalyst and the like, and the like. A sealant having such a formulation is used for assuring water tightness and air tightness by filling in a gap (joint) at a joint part or a contact part in such fields as construction, automobile, chemical industry and the like. In particular, it is used in a large amount for construction and used as a filler for an exterior wall.

However, a conventional resin composition for sealing involves tackiness (stickiness) remaining on the surface after curing, which may provide problems, such as damage on appearance due to dusts and sands easily attached thereto, deterioration of adhesiveness of a paint, and the like, and improvements are being demanded.

For solving the problems, there are proposals that a photocurable substance, such as a hydrolyzable silicon-containing polymer, an oligoester acrylate, a polyvinyl cinnamate compound and the like, is added to remove the surface tackiness (stickiness) (Patent Documents 1 and 2). However, the photocurable substance involves a problem of requiring a prolonged period of time until the function thereof is exhibited.

There is a proposal that a liquid diene polymer (such as polybutadiene or the like) is added to a hydrolyzable silicon-containing polymer (Patent Document 3). However, a liquid diene polymer has high viscosity, and when a large amount of a plasticizer is added thereto for ensuring workability, the plasticizer itself oozes on the surface (bleed-out) to cause stickiness.

Furthermore, there is a proposal of a one-component moisture-curable sealant containing (A) a urethane prepolymer with isocyanate end groups obtained by reacting an acryl polymer-containing polyol, which is obtained by polymerizing an alkyl acrylate ester in a polyoxyalkylene ether type polyol, with a polyisocyanate, and (B) a polyethylene glycol diester (Patent Document 4). However, the one-component moisture-curable sealant contains an acryl monomer that is not completely reacted to fail to solve the problem of stickiness, and also involves a problem in coating operation since the polyethylene glycol diester having high viscosity is contained.

There is a proposal of production of a urethane prepolymer by polymerizing an acrylic monomer in a polyol with a polymerization initiator having active hydrogen (Patent Document 5). However, the urethane prepolymer contains an acrylic monomer that is not completely reacted to fail to solve the problem of stickiness.

[Patent Document 1] JP-A-55-36241
[Patent Document 2] JP-A-5-65400
[Patent Document 3] JP-A-1-149851
[Patent Document 4] JP-A-11-50045
[Patent Document 5] JP-A-2001-115129

DISCLOSURE OF THE INVENTION

Problems to be Solved by the Invention

Under the circumstances, an object of the present invention is to provide a resin composition, particularly a resin composition for sealing, without surface stickiness that has low viscosity and excellent thixotropic property before curing, and has excellent adhesion property and low tackiness (stickiness) residual property after curing.

Means for Solving the Problems

As a result of earnest investigations made by the inventors for attaining the objects, it has been found that a resin composition for sealing can be adapted to the objects by mixing thereto, as a plasticizer for resin, a compound having a particular structural formula containing plural alkyl groups connected to each other, such as 9-methylenenonadecane, 2-decyl-2-octyloxirane and the like. The present invention is completed based on the findings.

The present invention provides a plasticizer for resin and a resin composition shown below.

1. A plasticizer for resin containing at least one of compounds represented by the following general formulae (I), (II), (III) and (IV):

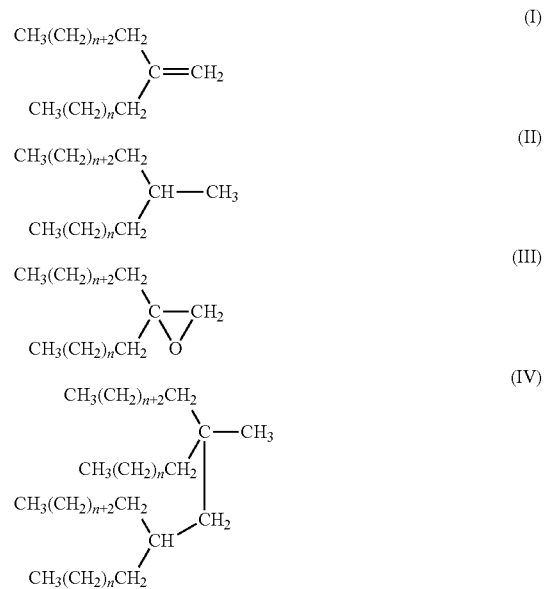

wherein n represents an integer of from 0 to 30.

2. The plasticizer for resin according to the item 1, wherein n in the general formulae (I), (II), (III) and (IV) represents an integer of from 0 to 20.

3. A resin composition containing a resin and the plasticizer for resin according to the item 1.

4. The resin composition according to the item 3, wherein the resin is a curable resin.

5. The resin composition according to the item 4, wherein the resin is a moisture-curable resin.

6. The resin composition according to the item 4 or 5, wherein the resin is a resin for sealing.

7. The resin composition according to the item 6, wherein the resin is a moisture-curable resin for sealing.

8. The resin composition according to the item 6, wherein the resin is a urethane resin for sealing.

9. The resin composition according to the item 6, wherein the resin is a silicone resin for sealing.

10. The resin composition according to the item 6, wherein the resin is a modified silicone resin for sealing.

11. The plasticizer for resin according to the item 1 or 2, which is used as a diluent for resin.

ADVANTAGES OF THE INVENTION

The resin composition of the present invention contains a resin for sealing and a plasticizer for resin containing at least one of compounds represented by the following general formulae (I), (II), (III) and (IV), and thus the resin composition has low viscosity and excellent thixotropic property before curing, and has excellent adhesion property and low tackiness (stickiness) residual property without surface stickiness after curing, thereby providing low viscosity and high workability before curing, and preventing dusts and sands from being attached to suppress deterioration of the appearance after curing.

Accordingly, the plasticizer for resin of the present invention can be favorably used for a resin composition for sealing for construction and automobile, thereby improving the workability and providing a sealant that are prevented from attachment of dusts and sands and involves less deterioration of the appearance.

BEST MODE FOR CARRYING OUT THE INVENTION

The plasticizer for resin of the invention containing at least one of compounds represented by the general formulae (I), (II), (III) and (IV) is favorably used as a resin composition for sealing containing a curable resin.

Examples of the curable resin include a moisture-curable resin, a urethane resin, a silicone resin, a modified silicone resin, a polysulfide resin, an acrylic urethane resin and the like, and in particular, the plasticizer for resin of the invention can be favorably used for a moisture-curable sealant, a urethane sealant, a silicone sealant and a modified silicone sealant.

In the compounds represented by the general formulae (I) (II), (III) and (IV) used in the plasticizer for resin of the present invention, n represents an integer of from 0 to 30, and preferably n represents an integer of from 0 to 20.

Examples of the compound represented by the general formula (I) include 3-methyleneheptane, 5-methyleneundecane, 7-methylenepentadecane, 9-methylenenonadecane, 11-methylenetricosane, 13-methyleneheptacosane, 15-methylenehentriacontane, 17-methylenepentatriacontane and the like.

Examples of the compound represented by the general formula (II) include 3-methylheptane, 5-methylundecane, 7-methylpentadecane, 9-methylnonadecane, 11-methyltricosane, 13-methylheptacosane, 15-methylenehentriacontane, 17-methylenepentatriacontane and the like.

Examples of the compound represented by the general formula (III) include 2-butyl-2-ethyloxirane, 2-butyl-2-hexyloxirane, 2-hexyl-2-octyloxirane, 2-decyl-2-octyloxirane, 2-decyl-2-dodecyloxirane, 2-dodecyl-2-tetradecyloxirane, 2-hexadecyl-2-tetradecyloxirane, 2-hexadecyl-2-octadecyloxirane and the like.

Examples of the compound represented by the general formula (IV) include 5,7-diethyl-5-methylundecane, 7,9-dibutyl-7-methylpentadecane, 9,11-dihexyl-9-methylnonadecane, 11-methyl-11,13-dioctyltricosane, 13,15-didecyl-13-methylheptacosane, 15,17-didodecyl-15-methylhentriacontane, 17-methyl-17,19-ditetradecylpentatriacontane, 19,21-dihexadecyl-19-methylnonatriacontane and the like.

The resin composition of the present invention contains the plasticizer for resin along with a resin and a filler.

Examples of the resin as a major component generally include polyurethane, polysulfide, silicone, modified silicone, polyisobutylene, an acrylic resin, a modified acrylic resin, an acrylic urethane resin, butyl rubber, an epoxy resin, a vinyl chloride resin, a fluorine resin and the like.

Examples of the filler generally include silica, talc, kaolin, bentonite, zeolite, resin balloon, glass balloon, surface-treated calcium carbonate, non-treated calcium carbonate, carbon black or the like, heavy calcium carbonate, light calcium carbonate, gluey calcium carbonate, titanium oxide, aluminum silicate, magnesium oxide, zinc oxide and the like.

The resin composition of the present invention may further contain, in addition to the aforementioned components, a tackiness imparting agent, a coupling agent, a heat stabilizer, a light stabilizer, an antistatic agent, a flame retardant, a dehydrating agent, a reinforcing agent, a dripping preventing agent, a surface-treating colorant (pigment), an antiaging agent, a curing catalyst and the like depending on necessity in such a range that does not impair the objects of the present invention. Examples of the dripping preventing agent include organic substances, such as hydrogenated castor oil, aliphatic amide wax, a polytetrafluoroethylene resin (trade name: PTFE) and the like, a higher fatty acid, an aliphatic ester, inorganic substances (for surface treatment), such as calcium carbonate and the like, and the like.

The content of the plasticizer for resin in the resin composition of the present invention is generally about from 0.1 to 100 parts by mass, and preferably from 0.1 to 50 parts by mass, per 100 parts by mass of the resin. The use of the plasticizer for resin in a content of 0.1 part by mass or more provides such advantages as that the resin composition is facilitated to have low viscosity and thixotropic property before curing, has no stickiness to prevent dusts and sands from being attached to the surface. The use of the plasticizer for resin in a content of 50 parts by mass or less prevents the sealant from dripping immediately after coating.

A method for producing the resin composition of the present invention is not particularly limited, and in general, the resin composition may be produced by mixing the resin, the filler, the plasticizer for resin, the tackiness imparting agent and the like, for example, with a mixer, a kneader, an extruder, a universal agitator or the like.

The propose of the resin composition of the present invention is not limited to a sealing material and may be applied, for example, to various kinds of adhesives, a waterproof material and the like.

The moisture-curable resin is a resin composition that undergoes curing from the surface through reaction with water content in the air, and examples thereof include a one-component silicone resin, a one-component modified silicone resin, a one-component polyurethane resin, a two-component modified silicone resin and the like.

In the case where the resin is a urethane resin and is a one-component urethane sealant using a urethane prepolymer, examples of a polyisocyanate compound used for synthesizing the urethane prepolymer include a polyisocyanate compound that is generally used for synthesizing a urethane compound, such as tolylenediisocyanate, diphenylmethanediisocyanate (purified MDI), a mixture of MDI and another compound (crude MDI), isophoronediisocyanate, hexamethylenediisocyanate and a derivative thereof, and the like.

Examples of a polyol used for synthesizing the urethane prepolymer include a polyoxyalkylene ether polyol obtained by ring-opening polymerization of propylene oxide, ethylene oxide, tetrahydrofuran or the like, a polyester polyol obtained by dehydration condensation of a dicarboxylic acid, such as adipic acid, orthophthalic acid, isophthalic acid, terephthalic acid, sebacic acid, itaconic acid, maleic anhydride and the like, and a glycol, such as ethylene glycol, diethylene glycol, triethylene glycol, tripropylene glycol, butanediol, hexanediol, neopentyl glycol and the like, a polymer polyol containing a polymer of butane diol, an acrylate ester or the like, and the like. The polyols may be used solely or in combination of two or more of them.

The reaction ratio of the polyol and the polyisocyanate compound is not particularly limited, and a molar ratio (NCO/OH) of the isocyanate group (NCO) in the polyisocyanate compound to the hydroxyl group (OH) in the acrylic polymer-containing polyol is preferably from 1.3 to 8.0, and more preferably from 1.5 to 3.0.

A method for producing the urethane prepolymer is not particularly limited, and an intended urethane prepolymer can be obtained, for example, by reacting a prescribed amount of the acrylic polymer-containing polyol and a prescribed amount of the polyisocyanate compound at a temperature of about from 80 to 100° C. for a period of about from 3 to 6 hours under an inert gas stream, such as nitrogen gas, or under reduced pressure.

Examples of the filler for the one-component urethane sealant include ordinary ones described above. In addition to the aforementioned components, the tackiness imparting agent described above and the like may be added depending on necessity in such a range that does not impair the objects of the present invention. A method for producing the one-component urethane sealant may be the same as the production method for the ordinary resin composition.

In the case of a two-component urethane sealant including an isocyanate compound as a base component and a polyol, a polyether polyol or a polyester polyol as a curing agent, examples of the isocyanate compound as a base component include an organic isocyanate compound and a modified product thereof, such as a compound having an isocyanate group, such as an aromatic isocyanate, an aliphatic isocyanate, an alicyclic isocyanate, a mixture thereof, a urethane prepolymer and the like, and the like. Specific examples thereof include an aromatic diisocyanate, such as tolylenediisocyanate (TDI) hydrogenated tolylenediisocyanate, diphenylmethanediisocyanate (MDI), polymeric MDI (PMDI), xylylenediisocyanate (XDI), 1,5-naphthalenediisocyanate (NDI) and the like, an aliphatic diisocyanate, such as hexamethylenediisocyanate (HDI) and the like, an alicyclic polyisocyanate, such as isophoronediisocyanate (IPDI), hydrogenated XDI (H6XDI), hydrogenated MDI (H12MDI), norbornanediisocyanate methyl (NBDI) and the like, a carbodiimide modified isocyanate and an isocyanurate modified product of the isocyanate, and the like.

The polyol as a curing agent contains a compound having active hydrogen, and the active hydrogen compound generally contains a polyamine having two or more amino groups per one molecule and/or a polyol having two or more hydroxyl group per one molecule. It may be the same as or different from one used for the urethane prepolymer. Examples thereof include a dihydric alcohol, such as ethylene glycol (EG), diethylene glycol, propylene glycol, dipropylene glycol, 1,3-butanediol, 1,4-butane diol, 4,4'-dihydroxyphenylpropane, 4,4'-dihydroxyphenylmethane and the like, glycerin, 1,1,1-trimethylolpropane, pentaerythritol, glucose, sucrose, sorbitol and the like.

Examples of the polyether polyol as a curing agent include a polyether polyol obtained by addition polymerization of one of or two or more of ethylene oxide, propylene oxide, butylene oxide and the like, and a polyether polyol, such as polytetramethylene ether glycol (PTMEG) obtained by ring-opening polymerization of tetrahydrofuran, and the like.

Examples of the polyester polyol as a curing agent include a polycaprolactone polyol, a polycarbonate polyol, a modified product of a polyether polyol or a polyester polyol, and the like, for example, a polyester polyol obtained by polycondensation of one of or two or more of ethylene glycol, propylene glycol, butanediol, pentanediol, hexanediol, glycerin, trimethylolpropane or another low molecular weight polyol and one of or two or more of glutaric acid, adipic acid, sebacic acid, terephthalic acid, isophthalic acid, dimer acid or another low molecular weight dicarboxylic acid or oligomer acid, or by ring-opening polymerization of caprolactone or the like.

Examples of the filler for the two-component urethane sealant include ordinary ones described above. In addition to the aforementioned components, the tackiness imparting agent described above and the like may be added depending on necessity in such a range that does not impair the objects of the present invention. A method for producing the two-component urethane sealant may be the same as the production method for the ordinary resin composition.

In the case where the resin composition is a silicone sealant, a silicone polymer as a major component is a polymer substance having two or more hydroxyl groups or hydrolyzable groups bonded to silicon. The main chain of the silicone polymer is a siloxane molecule chain, for example, a polyoxyalkylene chain. The silicone polymer as a major component is preferably polyorganosiloxane.

The polyorganosiloxane is a compound having the following siloxane unit.

wherein R represents a hydrocarbon group having from 1 to 6 carbon atoms, such as methyl, vinyl or phenyl group, or a fluorinated alkyl group, and s represents a value of 0, 1 or 2.

A substance that is preferred as the polyorganosiloxane is a linear substance, i.e., a substance wherein s=2 in all the units. The preferred substance has a polydiorganosiloxane chain of a general formula —$(R_2SiO)_n$—.

Examples of the filler for the silicone sealant include fumed silica or precipitated silica, pulverized quartz, diatom earth, calcium carbonate, barium sulfate, iron oxide, titanium dioxide, carbon black and the like.

As other components that may be contained in the resin composition, those that are ordinarily used for a silicone sealant may be added. For example, in addition to a plasticizer other than the plasticizer of the present invention and a pigment, polydimethylsiloxane having a triorganosiloxy end group may be used as a plasticizer. The organic substituent for the polydimethylsiloxane is methyl, vinyl, phenyl or a combination of these groups.

Examples a curing catalyst used for the resin composition include lead octanoate, dibutyl tin dilaurate, dibutyl tin diacetate, stannous octanoate, a dibutyl tin derivative and the like. The resin composition may contain a co-catalyst for increasing the crosslinking speed, and a substance improving adhesiveness, such as γ-aminopropyltriethoxysilane and the like.

A method for producing the silicone sealant is not particularly limited, and it can be produced by mixing the silicone compound with a filler, a dehydrating agent, a reinforcing agent, a dripping preventing agent, a colorant (pigment), an antiaging agent, a contact accelerating agent and the like, for example, with a roller, a kneader, an extruder, a universal agitator or the like.

In the case where the resin composition is a modified silicone sealant, examples of a modified silicone polymer used as a major component include a silyl group-containing organic polymer, such as a silyl group-containing polyether, a silyl group-containing polyester, a silyl group-containing vinyl polymer, a silyl group-containing polyester-modified vinyl polymer, a silyl group-containing diallyl phthalate polymer, a silyl group-containing diaryl phthalate polymer, a silyl group-containing polyisobutylene, a silyl group-containing ethylene-α-olefin copolymer, mixtures thereof, which each have at least one hydroxyl group or a silicon-containing group that has hydrolyzability and is capable of being crosslinked by forming a siloxane bond, bonded to a silicon atom.

In the case where the modified silicone polymer is a silyl group-containing polyether, a polyether as a main chain is one produced by such a method as cationic polymerization or anionic polymerization with ethylene oxide, propylene oxide, butene oxide, tetrahydrofuran or the like as a raw material, or the like. Specific examples thereof include Excestar, produced by Asahi Glass Co., Ltd., and the like.

In the case where the modified silicone polymer is a silyl group-containing polyester, a polyester main chain may be a polyester polyol compound prepared by reacting a carboxylic acid, such as maleic acid, succinic acid, glutaric acid, adipic acid, phthalic acid and the like, or an hydride, an ester or a halogenide thereof with a stoichiometrically excessive amount of a polyol, such as ethylene glycol, propylene glycol, glycerin and the like, a lactone polyol compound, obtained by ring-opening polymerization of lactone compound, or the like.

Examples of the filler for the modified silicone sealant include ordinary ones described above. Examples of a curing catalyst for the sealant include a tin compound, such as tin octylate, dibutyl tin dilaurate, dibutyl tin maleate, dibutyl tin phthalate and the like, an organic titanate ester, such as tetrabutyl titanate and the like, an amine compound, an amine salt, a quaternary ammonium salt, a guanidine compound and the like. These may be used solely or as a mixture.

In addition to the aforementioned components, the tackiness imparting agent described above and the like may be added depending on necessity in such a range that does not impair the objects of the present invention. A method for producing the modified silicone sealant may be the same as the production method for the ordinary resin composition.

The plasticizer for resin of the present invention may be used as a diluent for resin.

EXAMPLE

The present invention will be described in more detail with reference to examples, but the invention is not limited to the examples.

The methods for evaluating properties of resin compositions for sealing obtained in the examples and comparative examples are as follows.

(1) Viscosity of Resin Composition for Sealing Before Curing

A viscosity was measured with Rheometer VAR-50, produced by Reologica Instruments AB, at 25° C. and a shear velocity of 0.42 $s^{-1}$ and 4.2 $s^{-1}$.

As an index of thixotropy, a ratio of viscosities at a shear velocity of 0.42 $s^{-1}$ and 4.2 $s^{-1}$ was described. When the value is larger, the composition is hard to drip and can be easily applied in coating operation.

(2) Slump Resistance of Sealant

Referring to the method of "slump test" described in JIS A 1439 (test method of sealing material for construction), a sealant resin composition having been allowed to stand at 23° C. for 24 hours was charged in a slump test device for sealing material (an aluminum alloy channel container having a width of 10 mm, a depth of 10 mm and a length of 150 mm) having a polyethylene sheet covering the inner bottom thereof, and the test device was set up vertically.

In this state, the device was allowed to stand at 23° C. for 24 hours, and the length of the sealant dripping from the edge of the container was observed. The test temperature was 23° C.

(3) Tensile Test, Hardness, Adhesion Strength and Tackiness Residual Property of Cured Sheet A resin composition for sealing was coated between spacers having a thickness of 1 mm, and aged at 20° C. and 65% RH for 3 days and at 50° C. and 60% RH for 3 days to provide a test sheet.

A tensile test was performed with INSTRON 5582, Instron Co., Ltd., for a test piece No. 3 at a test speed of 500 mm/min and room temperature.

The hardness of the sheet was measured with Durometer Type E, produced by Teclock Corporation, for a sheet having a thickness of 8 mm.

The test for adhesiveness (adhesion strength) was performed with glass as an adherent (adhered area: 12.5 mm×25 mm) with INSTRON 5582, Instron Co., Ltd., at a test speed of 1 mm/min and room temperature.

The tackiness residual property (stickiness) was evaluated by hand, and one exhibiting no stickiness was evaluated as A, one exhibiting slight stickiness was evaluated as B, and one heavily sticky was evaluated as C.

Example 1

Resin Composition for Sealing A-1

The following resin, filler, plasticizer, thickener and the like were kneaded with a hybrid mixer to provide a resin composition for sealing A-1. The results of evaluation of properties are shown in Table 1.

| | |
|---|---|
| Modified silicone resin (Excestar S-2420, produced by Asahi Glass Urethane Co., Ltd.) | 100 parts by mass |
| Filler (gluey calcium carbonate) | 75 parts by mass |
| Filler (heavy calcium carbonate) | 75 parts by mass |
| Plasticizer (9-methylenenonadecane) | 40 parts by mass |
| Thickener (Disparlon 6500, produced by Kusumoto Chemicals, Ltd.) | 1 part by mass |
| Ultraviolet ray absorbent (TINUVIN 327, produced by Ciba Speciality Chemicals, Inc.) | 1 part by mass |

-continued

| | |
|---|---|
| Antioxidant (IRGANOX 1010, produced by Ciba Speciality Chemicals, Inc.) | 1 part by mass |
| Adhesiveness imparting agent (KBM-403, produced by Shin-Etsu Chemical Co., Ltd.) | 1 part by mass |
| Adhesiveness imparting agent (KBM-603, produced by Shin-Etsu Chemical Co., Ltd.) | 1 part by mass |
| Curing catalyst (Excestar C10, produced by Nihon Kagaku Sangyo Co., Ltd.) | 1 part by mass |

Example 2

Resin Composition for Sealing A-2

A resin composition for sealing A-2 was obtained in the same manner as in Example 1 except that the plasticizer was changed to 2-decyl-2-octyloxirane. The results of evaluation of properties are shown in Table 1.

Comparative Example 1

Resin Composition for Sealing B-1

A resin composition for sealing B-1 was obtained in the same manner as in Example 1 except that the plasticizer was changed to diisononyl phthalate (DINP). The results of evaluation of properties are shown in Table 1.

Comparative Example 2

Resin Composition for Sealing B-2

A resin composition for sealing B-2 was obtained in the same manner as in Example 1 except that the plasticizer was changed to polypropylene glycol (PPG) having an average molecular weight of 1,000.

The results of evaluation of properties are shown in Table 1.

TABLE 1

| | Example 1 | Example 2 | Comparative Example 1 | Comparative Example 2 |
|---|---|---|---|---|
| Resin | A-1 | A-2 | B-1 | B-2 |
| (Plasticizer) | | | | |
| 9-Methylenenonadecane | ○ | | | |
| 2-Decyl-2-octyloxirane | | ○ | | |
| Diisononyl phthalate | | | ○ | |
| Polypropylene glycol | | | | ○ |
| Evaluation results of properties (before curing) | | | | |
| Viscosity A (shear velocity: 4.2 s$^{-1}$ Pas) | 50 | 51 | 80 | 87 |
| Viscosity B (shear velocity: 0.42 s$^{-1}$ Pas) | 399 | 368 | 475 | 454 |
| Thixotropic property (viscosity B/viscosity A) | 8.0 | 7.2 | 5.9 | 5.2 |
| Slump resistance (after curing) | <1 mm | <1 mm | 1 mm | 1 mm |
| Hardness (Durometer E) | 47 | 46 | 48 | 48 |
| Maximum tensile stress (MPa) | 1.28 | 1.35 | 1.41 | 1.51 |
| 50% tensile stress (MPa) | 0.25 | 0.26 | 0.28 | 0.28 |
| Tensile elongation (%) | 323 | 322 | 323 | 320 |
| Adhesion strength (N/mm$^2$) | 1.73 | 1.70 | 1.53 | 1.78 |
| Tackiness residual property (stickiness, finger feeling) | A | A | B | B |

It is understood that as compared to the resin compositions for sealing of the comparative Examples (B-1 and B-2), the resin compositions for sealing of the examples (A-1 and A-2): (1) have a small viscosity and a large viscosity ratio and thus have excellent thixotropic property and excellent coating workability, (2) have excellent slump resistance and property of not dripping after coating, and (3) have hardness, tensile strength and adhesion strength equivalent to the comparative examples, but have no residual tackiness (stickiness) and are useful for reducing adhesion of dusts, sands or the like (contamination property) on the surface of the sealing material.

INDUSTRIAL APPLICABILITY

The addition of the plasticizer for resin of the present invention to a resin composition for sealing provides a resin composition without surface stickiness that has low viscosity and excellent thixotropic property before curing, and has excellent adhesion property and low tackiness residual property after curing, which can be favorably used as a resin composition for sealing for construction and automobile.

The invention claimed is:

1. A resin composition comprising:
   a curable resin; and
   a plasticizer,
   wherein the curable resin is a modified silicone resin, which is a silyl group-containing organic polymer, and
   wherein the plasticizer is at least one of 9-methylenenonadecane and 2-decyl-2-octyloxirane.

2. The resin composition according to claim 1, wherein the curable resin is a moisture-curable, modified silicone resin.

3. The resin composition according to claim 1, wherein the silyl group-containing organic polymer has at least one hydroxyl group or a silicon-containing group that has hydrolyzability and is capable of being crosslinked by forming a siloxane bond.

4. The resin composition according to claim 1, wherein the silyl group-containing organic polymer is selected from the group consisting of a silyl group-containing polyether, a silyl group-containing polyester, a silyl group-containing vinyl polymer, a silyl group-containing polyester-modified vinyl polymer, a silyl group-containing diallyl phthalate polymer, a silyl group-containing diaryl phthalate polymer, a silyl group-containing polyisobutylene, a silyl group-containing ethylene-α-olefin copolymer, and mixtures thereof.

5. The resin composition according to claim 1, wherein the silyl group-containing organic polymer is a silyl group-containing polyether.

6. The resin composition according to claim 1, wherein the silyl group-containing organic polymer is a silyl group-containing polyester.

7. The resin composition according to claim 1, wherein the silyl group-containing organic polymer is a silyl group-containing vinyl polymer.

8. The resin composition according to claim 1, wherein the silyl group-containing organic polymer is a silyl group-containing polyester-modified vinyl polymer.

9. The resin composition according to claim 1, wherein the silyl group-containing organic polymer is a silyl group-containing diallyl phthalate polymer.

10. The resin composition according to claim 1, wherein the silyl group-containing organic polymer is a silyl group-containing diaryl phthalate polymer.

11. The resin composition according to claim 1, wherein the silyl group-containing organic polymer is a silyl group-containing polyisobutylene.

12. The resin composition according to claim 1, wherein the silyl group-containing organic polymer is a silyl group-containing ethylene-α-olefin copolymer.

13. The resin composition according to claim 1, wherein the plasticizer is 9-methylenenonadecane.

14. The resin composition according to claim 1, wherein the plasticizer is 2-decyl-2-octyloxirane.

15. The resin composition according to claim 1, wherein the plasticizer is a combination of 9-methylenenonadecane and 2-decyl-2-octyloxirane.

16. A sealant comprising the resin composition according to claim 1.

* * * * *